June 21, 1949.  A. GORZKOWSKI  2,474,047
EXPANSIBLE PLUG FOR SEALING BORES
Filed March 7, 1946
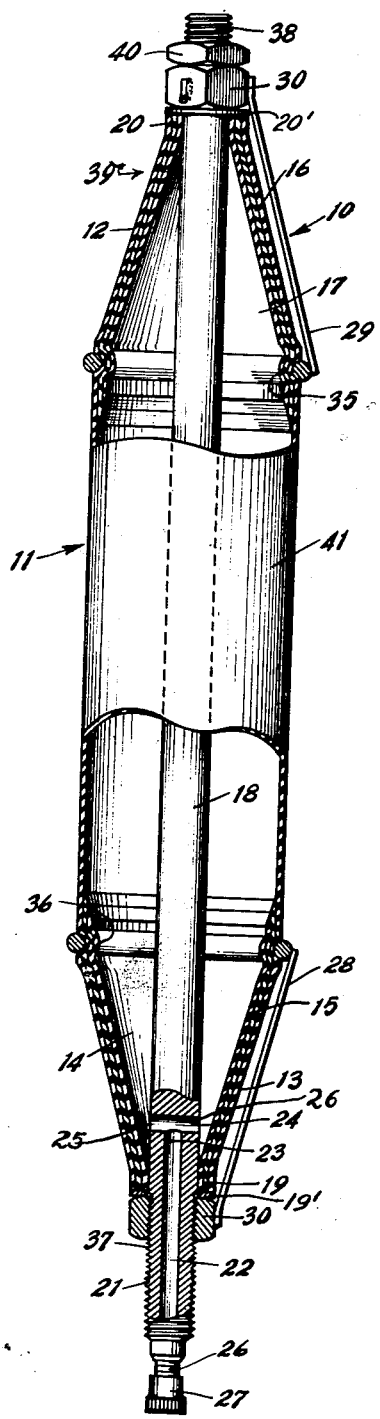
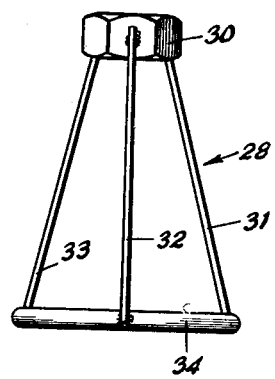
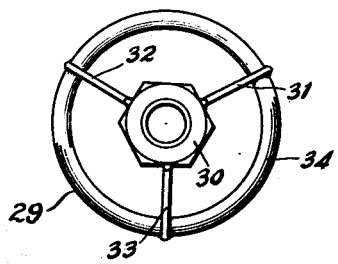
Inventor
*Andrew Gorzkowski*
By *Clarence A. O'Brien
and Harvey B. Jacobson*
Attorneys Patented June 21, 1949

2,474,047

UNITED STATES PATENT OFFICE 2,474,047

EXPANSIBLE PLUG FOR SEALING BORES

Andrew Gorzkowski, Avoca, Pa.

Application March 7, 1946, Serial No. 652,509

3 Claims. (Cl. 220—24.5)

The invention disclosed in the following specification taken with the accompanying drawings has for its primary object to provide a simple, inexpensive and rapid means whereby bores such as pipe lines, or in the earth may be effectively plugged.

This invention has for another object to provide a pipe which may be plugged through fluid pressure.

A still further object of the invention is to provide a tubular rubber plug adapted to be expanded within a pipe by fluid pressure to effectively close the pipe against any pressure in the pipe.

Other features and advantages will become more readily apparent from the following description and the accompanying illustrative drawings in which:

Figure 1 is a sectional elevational view of the invention,

Figure 2 is a detailed elevational view of cage, and

Figure 3 is an end elevational view thereof.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 has reference to the complete invention which consists of a rubber tube 11, of any length, diameter or thickness, which terminates in conic ends 12 and 13. These ends are reinforced by additional inserted reinforcing cones 14, 15 and 16 and 17 preferably vulcanized to the outer cones.

Slidably mounted on an elongated rod 18 extending longitudinally through tube 11, are suitable retaining washers 19' and 20' to which the ends 19 and 20 of member 14 are fixedly secured by vulcanizing or any other suitable means. The tapered ends of the tube are of such a resiliency to tightly and frictionally embrace rod 18 but may be adjusted relative to each other in a manner which will later be more fully described. The end 21 of the rod 18 is provided with a longitudinal bore 22 and the inner end 23 of the bore 22 intersects a transverse bore 24 provided in the rod 18. In the ends 25 and 26 of the bore 24 may be provided Schraeder or like valves. The extreme outer reduced end 26 of the rod is threaded for the Schraeder valve 27.

Mounted over each conic end 12 and 13 are cages 28 and 29, each being identically formed and each consisting of a hexnut 30 connected by rods 31, 32, and 33 to a ring 34, which seat in grooves 35 and 36 formed in the inner or base portions of the said tube ends 13 and 14. The nuts 30 of the cages 28 and 29 are screwed in upon the outer threaded ends 37 and 38 of the rod 18 and tightly against the said tube terminals 19 and 20. The inner tapered end 39' of the tube 11 forms a guide to direct it into a pipe or bore. Lock nuts 40 may be screwed in upon the nut 30 of the cage 29.

From the above description of the invention, it will obviously appear that upon inserting the device into a pipe or bore in collapsed condition and then inflating the same, with any fluid or semifluid, its body position 41 will completely close the bore against any pressure in the line being plugged.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

1. An expansible plug comprising a flexible body insertable within a fluid pressure line, said body having tapered ends, means for inflating said body and means for selectively contracting and expanding said body, said last mentioned means includes an elongated rod extending longitudinally through said body, members fixedly secured to the ends of said body and adjustably mounted on said rod, annular channels about said body adjacent each end, retaining rings received in said channels, and means rigidly securing said retaining rings to said members.

2. The combination of claim 1 wherein said means rigidly securing said retaining rings to said members includes guard rods having their terminal portions respectively secured to said members and said rings.

3. An expansible plug comprising a flexible body insertible within a fluid pressure line, said body having tapered ends, an elongated rod extending longitudinally through said body having screw threads formed on its terminal portions, members fixedly secured to the ends of said body and engageably receiving said rod for contracting and expanding said body relative to said rod, annular channels provided in the outer periphery of said body adjacent each end, retaining rings frictionally engaging said channels, rods connecting said rings to said members, longitudinal stud bores provided in said rod at each end, transverse ports in said rod communicating with said bores and the interior of said body, and means for controlling of the flow of fluid into said bore.

ANDREW GORZKOWSKI.

REFERENCES CITED

The following references are of record in the file of this patent:

UNITED STATES PATENTS

| Number | Name | Date |
| --- | --- | --- |
| 620,520 | Welstead | Feb. 28, 1899 |
| 756,644 | Johnson | Apr. 5, 1904 |
| 987,145 | Leisinger | Mar. 21, 1911 |
| 2,395,533 | Clem | Feb. 26, 1946 |